(12) United States Patent
Sasaoka

(10) Patent No.: US 6,449,415 B1
(45) Date of Patent: Sep. 10, 2002

(54) OPTICAL FIBER AND METHOD OF MANUFACTURING THE SAME

(75) Inventor: Eisuke Sasaoka, Kanagawa (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 10/051,143

(22) Filed: Jan. 22, 2002

Related U.S. Application Data

(63) Continuation of application No. 09/615,072, filed on Jul. 12, 2000, now Pat. No. 6,343,175, which is a continuation-in-part of application No. PCT/JP99/07060, filed on Dec. 16, 1999.

(30) Foreign Application Priority Data

Jan. 18, 1999 (JP) .......................................... 11-009244

(51) Int. Cl.$^7$ ................................................ G02B 6/02
(52) U.S. Cl. ......................... 385/123; 385/126; 385/127
(58) Field of Search ................................. 385/123–128

(56) References Cited

U.S. PATENT DOCUMENTS

| | | | | |
|---|---|---|---|---|
| 5,055,121 A | * | 10/1991 | Kanamori et al. | 65/398 |
| 5,781,684 A | | 7/1998 | Lui | 385/124 |
| 5,835,655 A | | 11/1998 | Liu et al. | 385/124 |
| 5,995,695 A | | 11/1999 | Aikawa | 385/123 |
| 6,266,467 B1 | * | 7/2001 | Kato et al. | 385/123 |
| 6,343,175 B1 | * | 1/2002 | Sasaoka | 385/123 |
| 2001/0017967 A1 | * | 8/2001 | Hirano et al. | 385/123 |
| 2001/0031119 A1 | * | 10/2001 | Kato et al. | 385/123 |
| 2002/0012511 A1 | * | 1/2002 | Kato et al. | 385/123 |

FOREIGN PATENT DOCUMENTS

| | | | |
|---|---|---|---|
| EP | 0 026 937 | 4/1981 | 385/123 |
| EP | 0181595 | 5/1986 | 385/123 |
| EP | 0 656 326 | 6/1995 | 385/124 |
| EP | 0656326 | 6/1995 | 385/124 |
| EP | 0 789 255 | 8/1997 | 385/123 |
| GB | 2 105 488 | 3/1983 | 385/123 |
| JP | 61-40843 | 2/1986 | 385/124 |
| JP | 6140843 | 2/1986 | 385/123 |
| JP | 62-012626 | 1/1987 | 385/123 |
| JP | 62-176941 | 8/1987 | 385/123 |
| JP | 63182233 | 7/1988 | 385/123 |
| JP | 63-182233 | 7/1988 | 385/124 |
| JP | 63-017233 | 1/1989 | 385/124 |
| JP | 3-218947 | 9/1991 | 385/123 |
| JP | 5-24873 | 2/1993 | 385/124 |
| JP | 6-171978 | 6/1994 | 385/123 |
| JP | 8-248251 | 9/1996 | 385/123 |
| JP | 10-53423 | 2/1998 | 385/124 |
| JP | 10-53429 | 2/1998 | 385/123 |
| JP | 10-87341 | 4/1998 | 385/124 |
| JP | 10-206654 | 8/1998 | 385/124 |
| JP | 10-206669 | 8/1998 | 385/123 |

OTHER PUBLICATIONS

"High Silica Core Single–Mode Fibers for 1.55$\mu$m Transmission", by Tanaka et al., Fujikura Technical Review, 1990.
"High Silica Core Single–Mode Fibers", by Tanaka et al. (No Date).

* cited by examiner

*Primary Examiner*—Brian Healy
*Assistant Examiner*—Kevin S Wood
(74) *Attorney, Agent, or Firm*—McDermott, Will & Emery

(57) ABSTRACT

This invention relates to an optical fiber having a structure that effectively reduces transmission loss and bending loss. An optical fiber according to this invention is an optical fiber mainly comprised of silica and including a core region and a cladding region covering the core region. The core region is doped with chlorine so as to have a refractive index higher than that of pure silica. The cladding region is doped with fluorine so as to have a refractive index lower than that of pure silica. The optical fiber, in particular, is characterized in that a peak value of a relative refractive index difference of the core region with respect to a refractive index of pure silica is 0.05% or more.

4 Claims, 7 Drawing Sheets

OPTICAL FIBER AND METHOD OF MANUFACTURING THE SAME

RELATED APPLICATIONS

This is a Continuation of U.S. patent application Ser. No. 09/615,072 filed Jul. 12, 2000, now U.S. Pat. No. 6,343,175 which is a Continuation-In-Part application of International Patent application serial No. PCT/JP99/07060 filed on Dec. 16, 1999.

BACKGROUND OF THE INVENTION

1. Field of the Invention

The present invention relates to an optical fiber suitable for an optical transmission line in a long-haul optical communication system.

2. Related Background Art

As optical transmission lines for transmitting light signals in an optical communication system, several types of optical fibers have been used or studied. For example, as the first prior art, a silica glass based fiber having a core region doped with germanium (to be referred to as a Ge-doped core optical fiber hereinafter) has been used. As the second prior art, a silica glass based fiber having a core region doped with no germanium and a cladding region formed around the core region and doped with fluorine (to be referred to as a pure silica core optical fiber hereinafter) has been used. As the third prior art, a silica glass based optical fiber is disclosed in Tanaka, et al., "High Silica Core Single-Mode Fibers for 1.55 μm Transmission", Fujikura Technical Review, 1990, in which the core region is doped with chlorine to reduce residual stress (to be referred to as a chlorine-doped core optical fiber hereinafter) so as to effectively suppress deformation of the refractive index profile of the optical fiber obtained after drawing.

SUMMARY OF THE INVENTION

The inventors have found the following problems upon examining the above prior arts. An optical fiber for communication is required to have a small transmission loss. In consideration of the use of an optical fiber for a cable, it is also required that the bending loss be small. In order to reduce bending loss, the relative refractive index difference of a core region with respect to the refractive index of a cladding region must be increased to increase light confinement efficiency.

In the above Ge-doped core optical fiber as the first prior art, a reduction in bending loss can be attained by increasing the contents of germanium in the core region and increasing the relative refractive index difference between the core region and the cladding region. If, however, a large amount of germanium is added in the core region on which the optical power of incident light concentrates, the transmission loss increases because the Rayleigh scattering coefficient caused by the germanium is larger than that caused by pure silica. For this reason, in the Ge-doped core optical fiber as the first prior art, it is difficult to effectively reduce both the transmission loss and the bending loss.

In the pure silica core optical fiber as the second prior art, a reduction in bending loss can be attained by increasing the contents of fluorine in the cladding region and increasing the relative refractive index difference between the core region composed of pure silica and the cladding region. In the second prior art, however, even if the contents of fluorine in the cladding region increases, the transmission loss due to Rayleigh scattering is small because the core region is composed of pure silica. However, it is difficult from a production viewpoint to add a large amount of fluorine in the cladding region. In addition, since the differences in physical property value (e.g., viscosity upon heating) between the core region and the cladding region increase, the transmission loss due to structural mismatching at the interface between the core region and the cladding region increases. In the pure silica core optical fiber as well, therefore, it is difficult to effectively reduce both the transmission loss and the bending loss.

In the chlorine-doped core optical fiber as the third prior art, according to Tanaka, in laying the a submarine cable, the level of bending loss upon bending with a diameter of 20 mm needs to be 3 to 1 dB/m or less. Such a description, however, states only a required value of bending loss. However, there is no description in this reference about how to realize an optical fiber that can satisfy this required value of bending loss. In addition, there is no description about a specific level to which bending loss can be actually reduced.

The present invention has been made to solve the above problems, and has as its object to provided an optical fiber having a structure that effectively reduces both transmission loss and bending loss, and a method of manufacturing the optical fiber.

An optical fiber according to the present invention contains silica as a main component and includes a core region containing a predetermined amount of chlorine and a cladding region which is provided on the periphery of the core region and which contains a predetermined amount of fluorine. A characteristic feature of the optical fiber, in particular, is that the peak value of the relative refractive index difference of the core region with respect to the refractive index of pure silica is 0.05% or more.

In the optical fiber according to the present invention, since the Rayleigh scattering coefficient caused by chlorine added in the core region is small, the transmission loss due to Rayleigh scattering is small. In addition, since chlorine is added as a dopant in the core region, the differences in physical property value between the core region and the cladding region decrease, and the transmission loss due to structure mismatching at the interface between the core region and the cladding region decreases. Furthermore, since the peak value of the relative refractive index difference of the core region with respect to the refractive index of pure silica is 0.05% or more, the bending loss is sufficiently reduced.

The concentration of chlorine added in the core region preferably increases from a peripheral portion of the core region toward its center. By setting the concentration of chlorine in a peripheral portion of the core region to be lower than that in the center of the core region, the differences in physical property value between the core region and the cladding region further decrease. This further decrease the transmission loss due to structure mismatching at the interface between the core region and the cladding region.

The chlorine added in the core region diffuses into the cladding region in the process of manufacturing the optical fiber according to the present invention, and hence chlorine is contained in at least part of the cladding region.

In the optical fiber according to the present invention, an increase in transmission loss due to an OH-radical at a wavelength of 1.38 μm is 0.5 dB/km or less. Such a reduction in transmission loss can be attained by sufficiently performing dehydration using a halogen gas in the process of manufacturing the optical fiber. Chlorine to be contained in the core region is also introduced in this dehydration step.

In the case shown in FIG. 8 in the reference by Tanaka, an increase in transmission loss due to an OH-radical at a wavelength of 1.38 μm exceeds 0.6 dB/km. That is, dehydration is not performed or not sufficiently performed.

The optical fiber according to the present invention has a zero dispersion wavelength at 1.34 μm or more. By setting a zero dispersion wavelength to 1.34 μm or more, chromatic dispersion at a wavelength of 1.55 μm is reduced. This eliminates the necessity of dispersion compensation or allows optical transmission at a wavelength of 1.55 μm with a small amount of dispersion compensation. By setting a zero dispersion wavelength in this manner, the transmission loss due to an OH-radical at a wavelength of 1.38 μm can be suppressed to 0.5 dB/km or less. This allows the use of a 1.38 μm band as a signal wavelength band.

In order to shift the zero dispersion wavelength to a long wavelength side while the relative refractive index difference between the core region and the cladding region is maintained constant, the diameter of the core region must be decreased. If, however, the diameter of the core region decreases, the bending loss increases. The bending loss can effectively be reduced by increasing the relative refractive index difference between the core region and the cladding region. However, as the relative refractive index difference is increased by increasing the contents of germanium in the core region, the transmission loss increases. In consideration of these points, according to this optical fiber, a sufficient relative refractive index difference is obtained by adding fluorine in the cladding region without containing germanium in the core region.

The optical fiber according to the present invention has an effective area of 100 $\mu m^2$ or more with respect to a wavelength band in use. If the effective area is 100 $\mu m^2$ or more, the non-linearity of the optical fiber is reduced. This makes it possible to effectively use this optical fiber in a case wherein a high-power optical input can be obtained as in WDM (Wavelength Division Multiplexing) transmission using an optical fiber amplifier.

Note that a depressed cladding structure is preferably used to effectively suppress an increase in bending loss and obtain a very large effective area. In the optical fiber according to the present invention, therefore, the cladding region may have a structure including an inner cladding provided on the periphery of the core region and having an average refractive index lower than that of the core region, and an outer cladding provided on the periphery of the inner cladding and having an average refractive index lower than that of the core region but higher than that of the inner cladding.

An optical fiber manufacturing method according to the present invention includes the first deposition step of obtaining a porous glass body serving as the core region, the dehydration step, and the first sintering step of making the porous glass body, obtained in the first deposition step, into a transparent glass body.

The above porous glass body is obtained by a vapor phase deposition method such as a VAD (Vapor phase Axial Deposition) method or OVD (Outside Vapor phase Deposition) method. The dehydration step is performed by heating the porous glass body obtained in the first deposition step in an atmosphere containing a chlorine element. At least the concentration of chlorine in the atmosphere must be adjusted such that the peak value of the relative refractive index difference of the core region with respect to pure silica in the obtained optical fiber becomes 0.05% or more.

This manufacturing method further includes the second deposition step of sequentially depositing one or more porous glass layers serving as a cladding region on the transparent glass body obtained in the first sintering step, and the second sintering step of making one or more porous glass layers, obtained in the second deposition step, into one or more transparent glass layers. Note that dehydration may be performed by heating the glass body in an atmosphere containing chlorine between the second deposition step and the second sintering step.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1A:
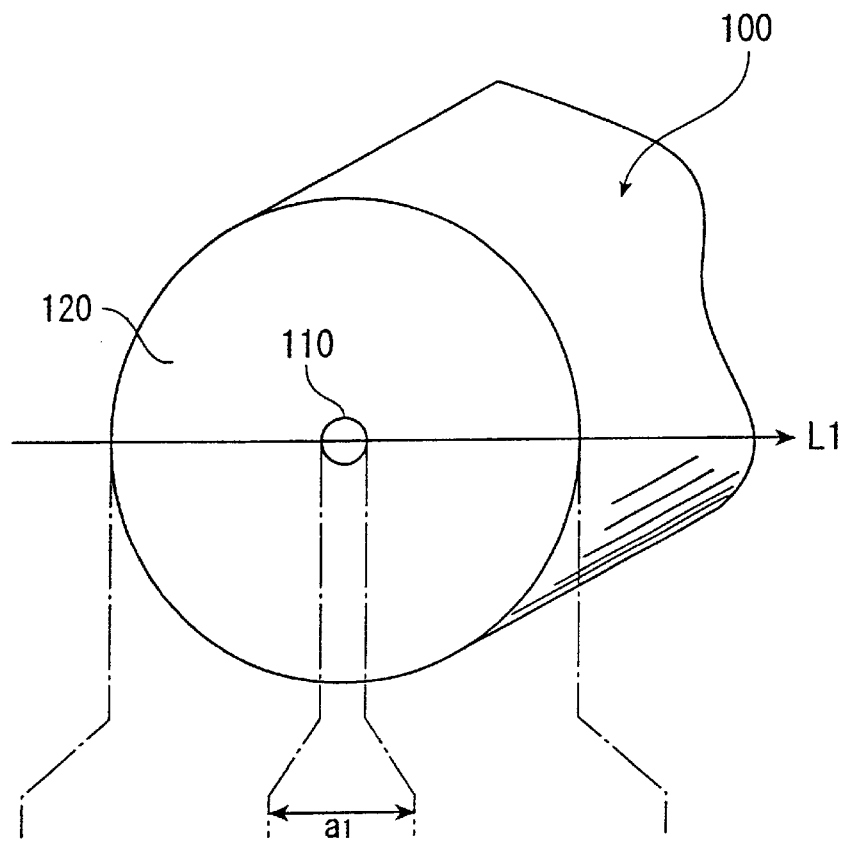
FIG. 1A is a view showing a cross-sectional structure of each of the first to fourth embodiments of the optical fiber according to the present invention.

Embodiments of the optical fiber according to the present invention will be described in detail below with reference to FIGS. 1A, 1B, 2, 3, and 4A to 7B. Note that the same reference numerals denote the same parts throughout the drawings, and a repetitive description will be avoided.

FIG. 1A shows a sectional structure of the first embodiment (ditto for the second to fourth embodiments) of the optical fiber according to the present invention.

Figure 1B:
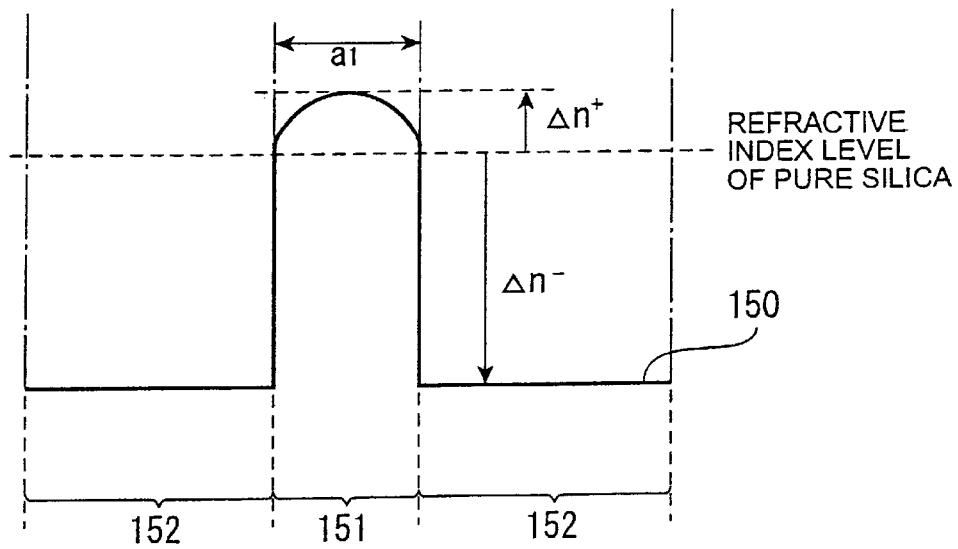
FIG. 1B is view showing the refractive index profile of the optical fiber according to each of the first and fourth embodiments.

FIG. 1B shows the refractive index profile of an optical fiber 100 according to the first embodiment.

As shown in FIG. 1A, the optical fiber 100 according to the first embodiment comprises a core region 110 having a diameter a1 and extending along a predetermined axis, and a cladding region 120 provided on the periphery of the core region 110. The core region 110 is doped with a predetermined amount of chlorine to have a refractive index higher than that of pure silica. The cladding region 120 is doped with a predetermined amount of fluorine to have a refractive index lower than that of pure silica. In the optical fiber 100 according to the first embodiment, in particular, the concentration of chlorine added in the core region 110 is set such that the peak value of a relative refractive index difference $\Delta n^+$ of the core region 110 with respect to the refractive index of pure silica becomes 0.05% or more. Note that the cladding region 120 has a relative refractive index difference $\Delta n^-$ with respect to pure silica.

In the optical fiber 100 according to the first embodiment, the concentration of chlorine added in the core region 110 increases from a peripheral portion of the core region 110 toward the center of the core region 110.

The abscissa of a refractive index profile 150 in FIG. 1B corresponds to the respective portions of a cross section (a surface perpendicular to the traveling direction of light signals propagating) of the optical fiber 100 according to the first embodiment (ditto for the second to fourth embodiments) in FIG. 1A on a line L1. A region 151 of the refractive index profile 150 corresponds to the refractive indexes of the respective portions of the core region 110 on the line L1, and a region 152 of the profile corresponds to the refractive indexes of the respective portions of the cladding region 120 on the line L1.

A relative refractive index difference $\Delta^+$ of the core region 110 and a relative refractive index difference $\Delta^-$ of the cladding region 120 with reference to pure silica are defined as follows:

$$\Delta^+ = (n_1 - n_0)/n_0$$

$$\Delta^- = (n_2 - n_0)/n_0$$

where $n_1$ is the refractive index of the core region 110, $n_2$ is the refractive index of the cladding region 120, and no is the refractive index of pure silica. In this specification, a relative refractive index difference $\Delta$ is represented in percentage, and the refractive indexes of the respective regions in the respective definition expressions are arranged in the fixed order. When the value of $\Delta$ is negative, therefore, the refractive index of the corresponding region is lower than that of pure silica.

In optical fibers according to the present invention, including the optical fiber 100 of the first embodiment, chlorine is contained in at least part of the cladding region. An increase in transmission loss due to an OH-radical at a wavelength of 1.38 μm is 0.5 dB/km or less. A zero dispersion wavelength is set at 1.34 μm or longer. Setting a zero dispersion wavelength at 1.34 μm or longer reduces chromatic dispersion at a wavelength of 1.55 μm, and eliminates the necessity of dispersion compensation or allows optical transmission at a wavelength of 1.55 μm with a small dispersion compensation amount. In addition, a 1.38-μm band can be used as a signal wavelength band by setting a zero dispersion wavelength in this manner and suppressing transmission loss at a wavelength of 1.38 μm due to an OH-radical to 0.5 dB/km or less. Furthermore, the optical fiber according to the present invention has an effective area $A_{eff}$ of 100 μm² or more with respect to a wavelength band in use. If the effective area $A_{eff}$ is 100 μm² or more, non-linearity of the optical fiber is reduced. This makes it possible to effectively use this optical fiber in a case wherein a high-power optical input can be obtained as in WDM transmission using an optical fiber amplifier.

As disclosed in Japanese Patent Laid-Open No. 8-248251 (EP 0 724 171 A2), the effective area $A_{eff}$ is given by $$A_{eff} = 2\pi \left( \int_0^\infty E^2 r\, dr \right)^2 / \left( \int_0^\infty E^4 r\, dr \right) \quad (1)$$

where E is the electric field accompanying propagating light, and r is the distance from the center of the core in the radial direction.

Figure 2:
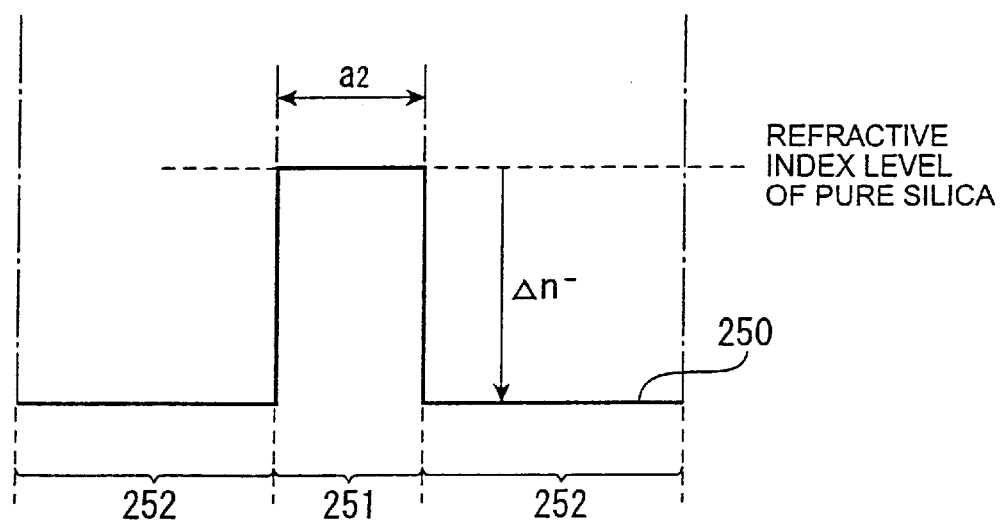
FIG. 2 is a view showing the refractive index profile of a pure silica core optical fiber as a comparative example.

FIG. 2 shows the refractive index profile of a pure silica core optical fiber as a comparative example. The pure silica core optical fiber as the comparative example has the same cross-sectional structure as that in the first embodiment shown in FIG. 1A, but differs from the first embodiment in that the core region comprised of pure silica. This comparative example comprises a core region having a diameter a2 and comprised of pure silica, and a cladding region provided on the periphery of the core region. Note that the cladding region is doped with a predetermined amount of fluorine to have a relative refractive index difference $\Delta^-(=(n_2-n_0)/n_0)$ with respect to the core region (pure silica).

The abscissa of a refractive index profile 250 corresponds to the respective portions on the line L1 in FIG. 1A like the refractive index profile in FIG. 1B. A region 251 corresponds to the refractive indexes of the respective portions on the line L1 in the core region, and a region 252 corresponds to the refractive indexes of the respective portions on a line L2 in the cladding region.

Figure 3:
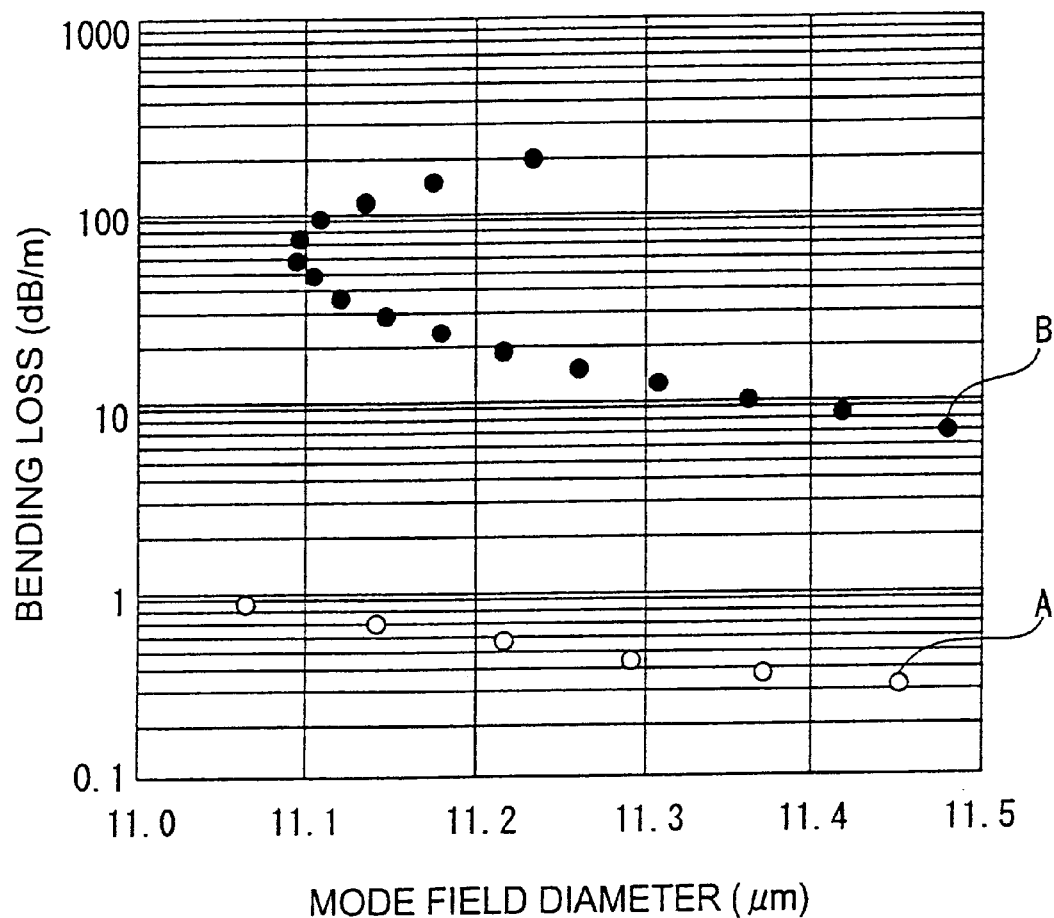
FIG. 3 is a graph showing the result obtained by performing a simulation concerning the relationship between the mode field diameter and bending loss of the optical fiber according to each of the first to fourth embodiments and the pure silica core optical fiber as a comparative example (the relative refractive index difference between the core region and the cladding region is constant)

FIG. 3 is a graph showing the result obtained by performing a simulation concerning the relationship between the mode field diameter and bending loss of each of the optical fiber 100 according to the first embodiment, which has the above structure, and the pure silica core optical fiber as a comparative example. White circles A plotted on FIG. 3 represent a simulation result on the optical fiber 100 according to the first embodiment, and black circles B represent a simulation result on the pure silica core optical fiber.

The following are simulation conditions. In each of the optical fibers according to the first embodiment and the pure silica core optical fiber as a comparative example, the relative refractive index difference $\Delta n^-$ of the cladding region with respect to the refractive index of pure silica is −0.3%, and each measurement value of bending loss (dB/m) is obtained at a wavelength of 1.55 μm when the fiber is bent with a diameter of 20 mm. Note that in the optical fiber according to the first embodiment, the peak value of the relative refractive index difference $\Delta n^+$ of the core region with respect to the refractive index of pure silica is 0.05%.

As is obvious from this graph, the bending loss of the optical fiber 100 according to the first embodiment decreases by one or more orders of magnitudes as compared with the pure silica core optical fiber. When, for example, the mode field diameter is 11.2 μm, the bending loss of the pure silica core optical fiber is about 20 dB/m, whereas the bending loss of the optical fiber 100 is about 0.6 dB/m.

The results obtained by actually manufacturing two types of samples and comparing/evaluating the samples will be described next. Note that the first sample manufactured is the optical fiber 100 according to the first embodiment, and the second sample manufactured is the pure silica core optical fiber as a comparative example.

In the first sample manufactured (the optical fiber 100 according to the first embodiment), the diameter a1 of the core region 110 was 11.0 μm; the peak value of the relative refractive index difference Δn⁺ of the core region 110 with respect to the refractive index of pure silica, 0.05%; the relative refractive index difference Δn⁻ of the cladding region 120 with respect to the refractive index of pure silica, −0.3%; and the transmission loss at a wavelength of 1.55 μm, 0.175 dB/km. In addition, the cutoff wavelength at a length of 2 m was 1.53 μm; the mode field diameter at a wavelength of 1.55 μm, 11.2 μm; and the bending loss at a wavelength of 1.55 μm upon bending with a diameter of 20 mm, 0.5 dB/m. In the case of the first sample, an increase in transmission loss due to an OH-radical at a wavelength of 1.38 μm was 0.3 dB/km.

In the second sample manufactured (the pure silica core optical fiber), the diameter a2 of the core region was 9.2 μm; the relative refractive index difference Δn⁻ of the cladding region with respect to the refractive index of the core region (pure silica), −0.3%; the transmission loss at a wavelength of 1.55 μm, 0.176 dB/km; the cutoff wavelength at a length of 2 m, 1.25 μm; the mode field diameter at a wavelength of 1.55 μm, 11.2 μm; and the bending loss at a wavelength of 1.55 μm upon bending with a diameter of 20 mm, 20.3 dB/m. These evaluation results agree with the above simulation results.

Second Embodiment

The second embodiment of the optical fiber according to the present invention will be described next. An optical fiber 100 according to the second embodiment comprises a chlorine-doped core region 110 and a fluorine-doped cladding region 120 as in the first embodiment shown in FIG. 1A. The optical fiber 100 of the second embodiment therefore has a refractive index profile similar to that shown in FIG. 1B.

In a sample manufactured as the second embodiment, the core region 110 is doped with chlorine such that the peak value of a relative refractive index difference Δn⁺ (=n₁−n₀)/n₀) of the core region 110 with respect to the refractive index of pure silica becomes 0.10%, and the cladding region 120 is doped with fluorine such that a relative refractive index difference Δn⁻(=(n₂−n₀)/n₀) of the cladding region with respect to the refractive index of pure silica becomes −0.25%. A diameter a1 of the core region 110 was 13.0 μm; and the transmission loss at a wavelength of 1.55 μm, 0.171 dB/km. In addition, the cutoff wavelength at a length of 2 m was 1.60 μm; the mode field diameter at a wavelength of 1.55 μm, 12.1 μm; and the bending loss at a wavelength of 1.55 μm upon bending with a diameter 20 mm, 0.2 dB/m. In the case of this sample as well, an increase in transmission loss due to an OH-radical at a wavelength of 1.38 μm was 0.3 dB/km.

In a sample of the pure silica core optical fiber manufactured as a comparative example, a diameter a2 of the core region was 9.4 μm; the relative refractive index difference Δn⁻ of the cladding region with respect to the refractive index of the core region (pure silica); −0.25%; and the transmission loss at a wavelength of 1.55 μm, 0.170 dB/km. In addition, the cutoff wavelength at a length of 2 m was 1.16 μm; the mode field diameter at a wavelength of 1.55 μm, 12.1 μm; and the bending loss at a wavelength of 1.55 μm upon bending with a diameter of 20 mm, 77.5 dB/m.

Third Embodiment

The third embodiment of the optical fiber according to the present invention will be described next. An optical fiber 100 according to the third embodiment comprises a chlorine-doped core region 110 and a fluorine-doped cladding region 120 as in the first embodiment shown in FIG. 1A. The optical fiber 100 of the third embodiment therefore has a refractive index profile similar to that shown in FIG. 1B.

In a sample manufactured as the third embodiment, the core region 110 is doped with chlorine such that the peak value of a relative refractive index difference Δn⁺ (=n₁−n₀)/n₀) of the core region 110 with respect to the refractive index of pure silica becomes 0.10%, and the cladding region 120 is doped with fluorine such that a relative refractive index difference Δn⁻ (=(n₂−n₀)/n₀) of the cladding region with respect to the refractive index of pure silica becomes −0.35%. In addition, a diameter a1 of the core region is set to 6.8 μm to set a zero dispersion wavelength to 1.35 μm.

In the sample of the third embodiment manufactured in the above manner, the characteristics at a wavelength of 1.55 μm were:

| | |
|---|---|
| transmission loss (dB/km): | 0.173 |
| chromatic dispersion (ps/nm/km): | 11.7 |
| dispersion slope (ps/nm²/km): | 0.052 |
| mode field diameter (μm): | 9.29 |
| bending loss at diameter of 20 mm (dB/m): | 13.3 |

The cutoff wavelength at a length of 2 m was 1.10 μm; and an increase in transmission loss due to an OH-radical at a wavelength of 1.38 μm, 0.3 dB/km. In this specification, a dispersion slope is given as the slope of a plot representing the wavelength dependence of dispersion.

In the pure silica core optical fiber sample manufactured as a comparative example, the cladding region is doped with fluorine such that the relative refractive index difference Δn⁻ of the cladding region with respect to the refractive index of the core region (pure silica) becomes −0.35%, and a diameter a2 of the core region is set to 7.0 μm so as to set the zero dispersion wavelength to 1.35 μm.

In the sample manufactured as a comparative example, the characteristics at a wavelength of 1.55 μm were:

| | |
|---|---|
| transmission loss (dB/km): | 0.172 |
| chromatic dispersion (ps/nm/km): | 12.5 |
| dispersion slope (ps/nm²/km): | 0.054 |
| mode field diameter (μm): | 10.3 |
| bending loss at diameter of 20 mm (dB/m): | 73.5 |

The cutoff wavelength at a length of 2 m was 1.00 μm.

As is obvious from the above measurement results, the optical fiber 100 according to the third embodiment can greatly reduce the bending loss while maintaining a zero dispersion wavelength and transmission characteristics such as transmission loss characteristics equivalent to those in the conventional pure silica core optical fiber.

Fourth Embodiment

The fourth embodiment of the optical fiber according to the present invention also comprises a chlorine-doped core region 110 and a fluorine-doped cladding region 120 as in the first embodiment shown in FIG. 1A. An optical fiber 100 of the fourth embodiment therefore has a refractive index profile similar to that shown in FIG. 1B.

In a sample manufactured as the fourth embodiment, the core region 110 is doped with chlorine such that the peak value of a relative refractive index difference Δn⁺(=n₁−n₀)/n₀) of the core region 110 with respect to the refractive index of pure silica becomes 0.05%, and the cladding region 120 is doped with fluorine such that a relative refractive index difference Δn⁻(=(n₂−n₀)/n₀) of the cladding region with respect to the refractive index of pure silica becomes −0.30%. In addition, a diameter a1 of the core region is set to 11.4 μm such that an effective area $A_{eff}$ at a wavelength of 1.55 μm becomes 103 μm².

In the sample of the fourth embodiment manufactured in the above manner, the characteristics at a wavelength of 1.55 μm were:

| | |
|---|---|
| transmission loss (dB/km): | 0.172 |
| chromatic dispersion (ps/nm/km): | 20.5 |
| dispersion slope (ps/nm²/km): | 0.059 |
| mode field diameter (μm): | 11.4 |
| bending loss at diameter of 20 mm (dB/m): | 0.4 |

The cutoff wavelength at a length of 2 m was 1.58 μm; and an increase in transmission loss due to an OH-radical at a wavelength of 1.38 μm, 0.3 dB/km. In the sample of the fourth embodiment, the cutoff wavelength at a length of 2 m is longer than the wavelength in use (1.58 μm). However, no practical problem arises because the cable cutoff wavelength (measured at a length of 22 m) defined by ITU is 1.50 μm.

In the pure silica core optical fiber sample manufactured as a comparative example, the cladding region is doped with fluorine such that the relative refractive index difference $\Delta_{-}$ of the cladding region with respect to the refractive index of the core region (pure silica) becomes −0.30%, and a diameter a2 of the core region is set to 10.2 μm such that the effective area $A_{eff}$ at a wavelength of 1.55 μm becomes 103 μm².

In the sample manufactured as the comparative example, the characteristics at a wavelength of 1.55 μm were:

| | |
|---|---|
| transmission loss (dB/km): | 0.172 |
| chromatic dispersion (ps/nm/km): | 19.1 |
| dispersion slope (ps/nm²/km): | 0.057 |
| mode field diameter (μm): | 11.5 |
| bending loss at diameter of 20 mm (dB/m): | 6.7 |

The cutoff wavelength at a length of 2 m was 1.38 μm.

As is obvious from the above measurement results, the optical fiber 100 according to the fourth embodiment can greatly reduce the bending loss while maintaining the effective area $A_{eff}$ and transmission characteristics such as transmission loss characteristics equivalent to those in the conventional pure silica core optical fiber.

Fifth Embodiment

Each of the first to fourth embodiments described above has a matched type refractive index profile with a single cladding region. A depressed cladding type refractive index profile is effective in effectively suppressing an increase in bending loss and obtaining a large effective area $A_{eff}$. An optical fiber according to the fifth embodiment therefore has a depressed cladding structure in which the above cladding is made up of an inner cladding provided on the periphery of the core region and having an average refractive index lower than that of the core region, and an outer cladding provided on the periphery of the inner cladding and having an average refractive index lower than that of the core region but higher than that of the inner cladding.

Figure 4A:
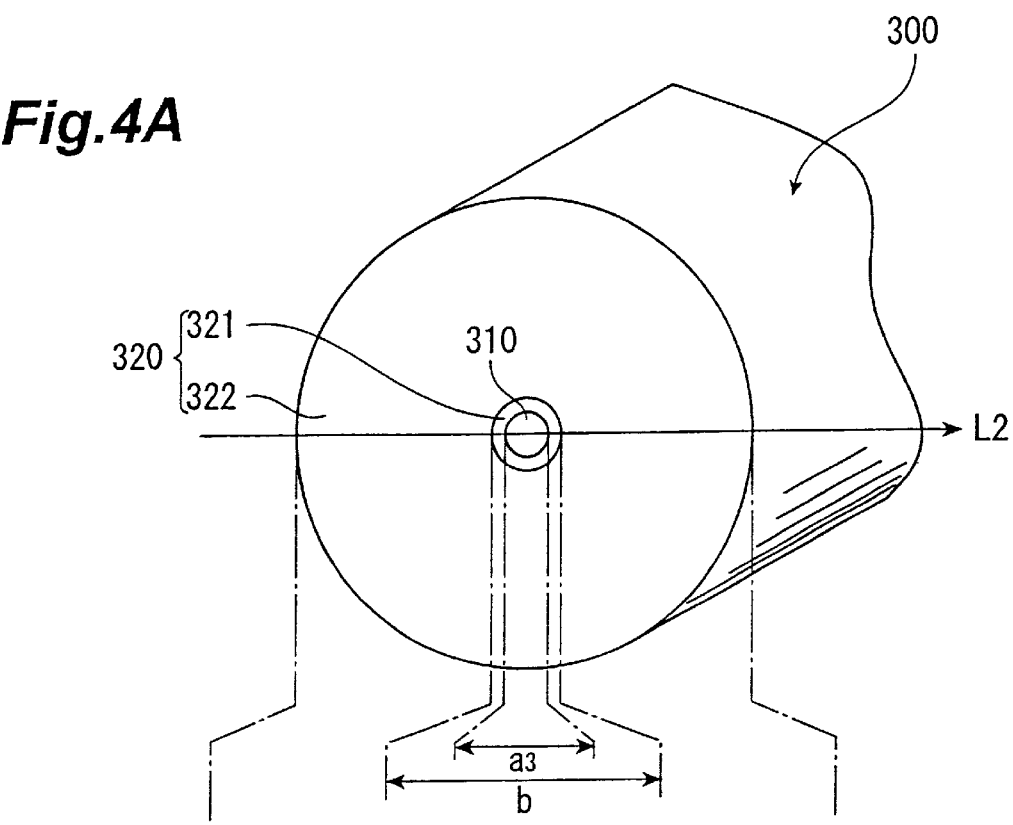
FIG. 4A is a view showing a cross-sectional structure of the fifth embodiment of the optical fiber according to the present invention.
Figure 4B:
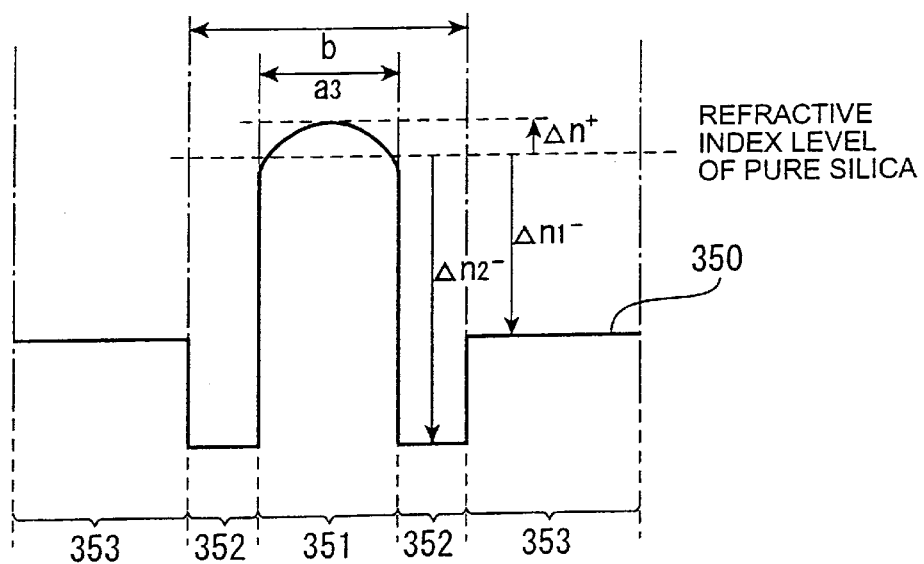
FIG. 4B is a view showing the refractive index profile of the optical fiber according to the fifth embodiment.

FIG. 4A shows the cross-sectional structure of the fifth embodiment of the optical fiber according to the present invention. FIG. 4B shows the refractive index profile of an optical fiber 300 according to the fifth embodiment.

As shown in FIG. 4A, the optical fiber 300 according to the fifth embodiment has a core region 310 having a diameter a3 and extending along a predetermined axis and a cladding region 320 provided on the periphery of the core region 310. Note that the cladding region 320 comprises an inner cladding 321 provided on the periphery of the core region 310 and having an average refractive index lower than that of the core region, and an outer cladding 322 provided on the periphery of the inner cladding 321 and having an average refractive index higher than that of the inner cladding but lower than that of the core region. The core region 310 is doped with a predetermined amount of chlorine to have a refractive index higher than that of pure silica. In the cladding region 320, each of the inner and outer claddings 321 and 322 is doped with a predetermined amount of fluorine to have a refractive index lower than that of pure silica. In the optical fiber 300 according to the fifth embodiment, in particular, the concentration of chlorine added in the core region 310 is set such that the peak value of a relative refractive index difference $\Delta n^+$ of the core region 310 with respect to the refractive index of pure silica becomes 0.05% or more. The inner and outer claddings respectively have a relative refractive index difference $\Delta n_2^-$ and a relative refractive index difference $\Delta n_1^-$ with respect to pure silica. In the optical fiber 300 according to the fifth embodiment as well, the concentration of chlorine added in the core region 310 increases from a peripheral portion of the 310 toward the center of the core region 310.

The abscissa of a refractive index profile 350 in FIG. 4B corresponds to the respective portions of a cross section (a surface perpendicular to the traveling direction of light signals propagating) of the optical fiber 300 according to the fifth embodiment in FIG. 4A on a line L2. On the refractive index profile 350, a region 351 corresponds to the refractive indexes of the respective portions of the core region 310 on the line L2; a region 352, the refractive indexes of the respective portions of the inner cladding 321 on the line L2; and a region 353, the refractive indexes of the respective portions of the outer cladding 322 on the line L2.

Relative refractive index differences $\Delta^+$, $\Delta_2^-$, and $\Delta_1^-$ of the core regions 310, inner cladding 321, and outer cladding 322 with reference to pure silica are defined as follows:

$$\Delta^+ = (n_1 - n_0)/n_0$$

$$\Delta_1^- = (n_2 - n_0)/n_0$$

$$\Delta_2^- = (n_3 - n_0)/n_0$$

where $n_1$ is the refractive index of the core region 110, $n_2$ is the refractive index of the outer cladding 322, $n_3$ is the refractive index of the inner cladding 321, and no is the refractive index of pure silica. A relative refractive index difference $\Delta$ is represented in percentage, and the refractive indexes of the respective regions in the respective definition expressions are arranged in the fixed order. If the value of $\Delta$ is negative, therefore, the refractive index of the corresponding region is lower than that of pure silica.

In a sample manufactured as the fifth embodiment, a diameter a3 of the core region 310 is 14.8 μm, and a diameter b of the inner cladding 321 is 59.0 μm. The core region 310 is doped with chlorine such that the peak value of the relative refractive index difference $\Delta n^+$ $(=(n_1-n_0)/n_0)$ of the core region 310 with respect to the refractive index of pure silica becomes 0.07%. The inner cladding 321 and outer cladding 322 are doped with fluorine such that the relative refractive index differences $\Delta n_1^-$ $(n_2-n_0)/n_0)$ and $\Delta n_2^-$ $(=(n_3-n_0)/n_0)$ respectively become −0.23% and −0.16%.

The sample of the fifth embodiment manufactured in this manner has the following characteristics at a wavelength of 1.55 μm:

| | |
|---|---|
| effective area $A_{\text{eff}}$ ($\mu m^2$): | 153 |
| transmission loss (dB/km): | 0.170 |
| chromatic dispersion (ps/nm/km): | 0.063 |
| bending loss (dB/m) at diameter 20 mm: | 0.2 |

The cutoff wavelength at a length of 2 m was 1.45 μm, and an increase in transmission loss due to an OH-radical at a wavelength of 1.38 μm was 0.3 dB/km.

As is obvious from the measurement results on the fifth embodiment, the use of the depressed cladding structure can greatly increase the effective area $A_{\text{eff}}$ while suppressing an increase in bending loss.

As described above, the optical fiber according to the present invention can greatly reduce bending loss as compared with the pure silica core optical fiber while maintaining the same transmission loss and mode field diameter as those of the pure silica core optical fiber.

A method of manufacturing an optical fiber according to the present invention will be described next with reference to FIGS. 5A to 7B. Note that the detailed manufacturing steps are disclosed in Japanese Patent Laid-Open Nos. 5-24873, 10-53423, and 10-206669.

According to the method of manufacturing an optical fiber according to the present invention, a porous glass body 50 serving as the core region 110 is formed first by a vapor phase deposition method such as VAD (Vapor phase Axial Deposition) method or OVD (Outside Vapor phase Deposition) (the first deposition step).

Figures 5A, 5B:
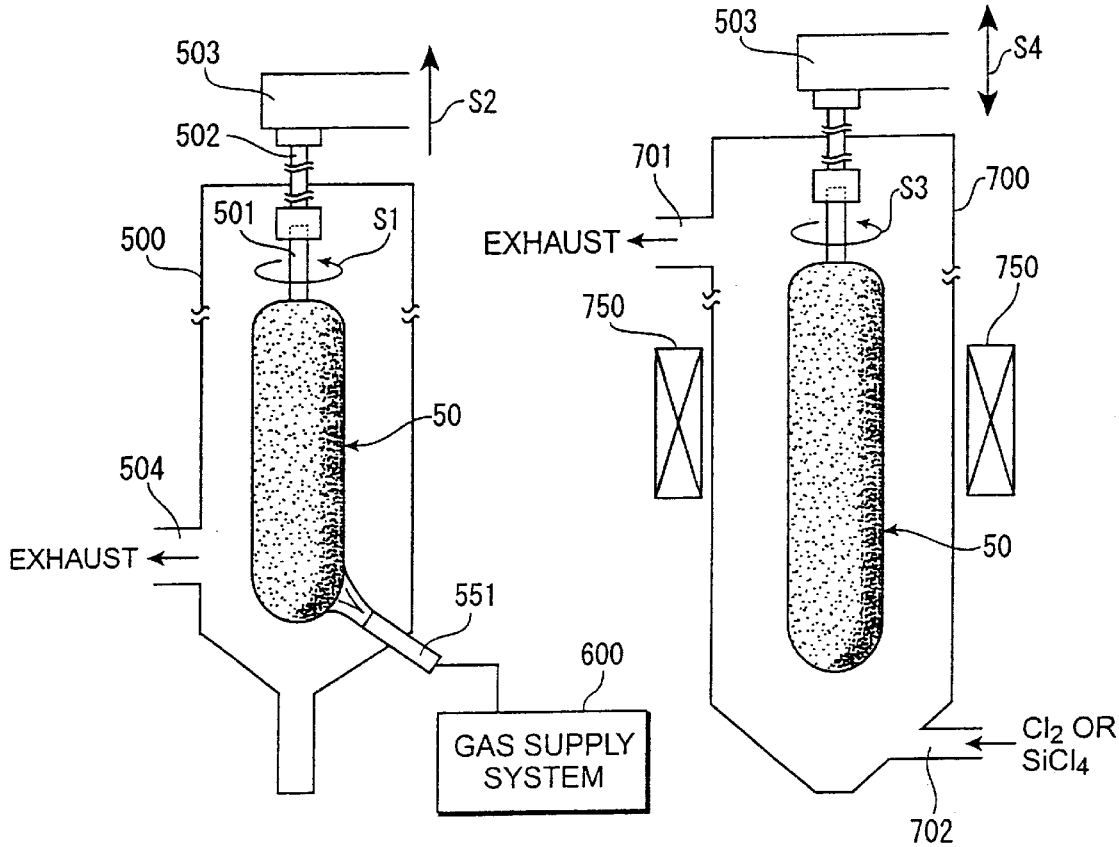
FIGS. 5A to 5C are views for respectively explaining the first deposition step (FIG. 5A), the dehydration step (FIG. 5B), and the first sintering step (FIG. 5C) in the process of manufacturing the optical fiber according to the present invention.
Figure 5C:
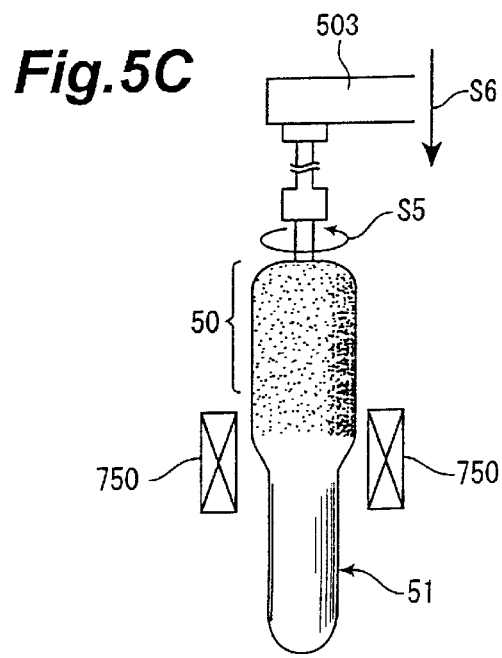

FIGS. 5A to 5C are views showing the steps to be executed until a glass preform serving as the core region 110 (310) is obtained by the above VAD method. FIG. 5A shows the first deposition step; FIG. 5B, the dehydration step; and FIG. 5C, the first sintering step.

In the first deposition step, the porous glass body 50 is manufactured by a soot forming device in FIG. 5A. This soot forming device includes a vessel 500 having at least an exhaust port 504, and a support mechanism 503 for supporting the growing porous glass body 50 (soot body). The support mechanism 503 has a rotatable rod 502. A starting rod 501 for growing the porous glass body 50 is attached to the distal end of the support rod 502.

The soot forming device in FIG. 5A includes a burner 551 for depositing the porous glass body 50 serving as the core region 110 (310). A gas supply system 600 supplies a desired material gas (e.g., $GeCl_4$, $SiCl_4$, or the like) and fuel gases ($H_2$ and $O_2$), and a carrier gas such as Ar or He to the burner 551.

During the manufacture of the porous glass body 50, while the burner 551 is producing a flame, glass particulates are generated by a hydrolytic reaction of the material gas supplied from the gas supply system 600. These glass particulates are deposited on the distal end portion of the starting rod 501. During this period, the support mechanism 503 raises the support rod 502 mounted on the distal end along the direction indicated by an arrow S2 (the longitudinal direction of the porous glass body 50) while rotating the support rod in the direction indicated by an arrow S1. With this operation, a porous glass body grows downward from the starting rod 501, thus obtaining the porous glass body 50.

The porous glass body 50 obtained in the first deposition step described above is placed in a heating vessel 700 in FIG. 5B to undergo dehydration in an atmosphere containing a predetermined amount of chlorine. Note that the heating vessel 700 has an inlet port 702 for supplying a dehydration gas and an exhaust port 701. During this dehydration, the support mechanism 503 operates to move the porous glass body 50 along the direction indicated by an arrow S4 while rotating it in the direction indicated by an arrow S3 (with this operation, the entire porous glass body 50 is heated). Even if a halogen gas such as $SiCl_4$, other than chlorine gas, is used as a dehydration gas, a similar effect can be obtained. $SiCl_4$, in particular, can be a means of increasing the contents of chlorine and increasing the refractive index of the core region 110 (310).

The porous glass body 50 obtained through the above process is sintered in the heating vessel 700. FIG. 5C shows only the main part of the heating vessel in FIG. 5B. As shown in FIG. 5C, the support mechanism 503 operates to move the porous glass body 50 along the direction indicated by an arrow S6 while rotating the porous glass body 50 in the direction indicated by an arrow S5. With this operation, the porous glass body 50 is transferred into a heater 750 from its leading end, and a transparent core glass preform 51 is obtained.

Note that the above manufacturing, dehydration, and sintering processes for the porous glass body 50 can be performed in the same vessel. Although the first deposition step is performed by the VAD method according to the above description, the first deposition step may be performed by another vapor phase deposition method such as the OVD method.

A drawn core glass preform 52 can be obtained by drawing the core glass preform 51 obtained in the above manner to a desired diameter in a drawing step. In the second deposition step, a porous glass layer serving as the cladding region 120 (320) is deposited on the outer surface of this drawn core glass preform 52.

Figure 6A:
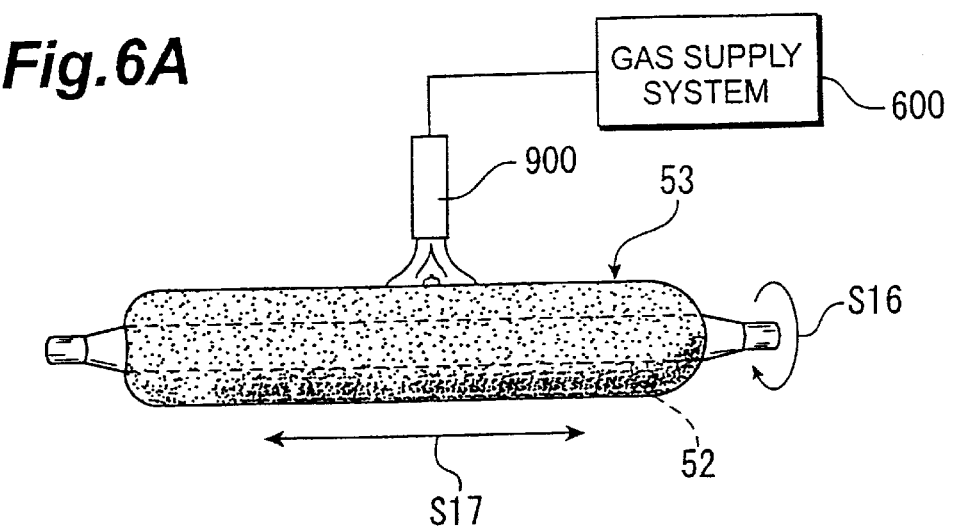
FIGS. 6A and 6B are views for respectively explaining the second deposition step (FIG. 6A) and the dehydration step (FIG. 6B) in the process, of manufacturing the optical fiber according to the present invention.

As shown in FIG. 6A, while a burner 900 is producing a flame, glass particulates are generated by a hydrolytic reaction of a material gas supplied from the gas supply system 600 and deposited on the periphery of the outer surface of the drawn core glass preform 52. Meanwhile, the drawn core glass preform 52 moves along the direction indicated by an arrow S17 while rotating in the direction indicated by an arrow S16. With this operation, a porous glass layer (soot body) is deposited on the periphery of the outer surface of the drawn core glass preform 52 to obtain a porous intermediate product 53 (soot preform). If the cladding region 320 is made up of a plurality of regions 321 and 322 like the optical fiber 300 according to the fifth embodiment, the second deposition step (FIG. 6A) is performed by a required number of times while the concentration of a supplied gas is changed.

Figure 6B:
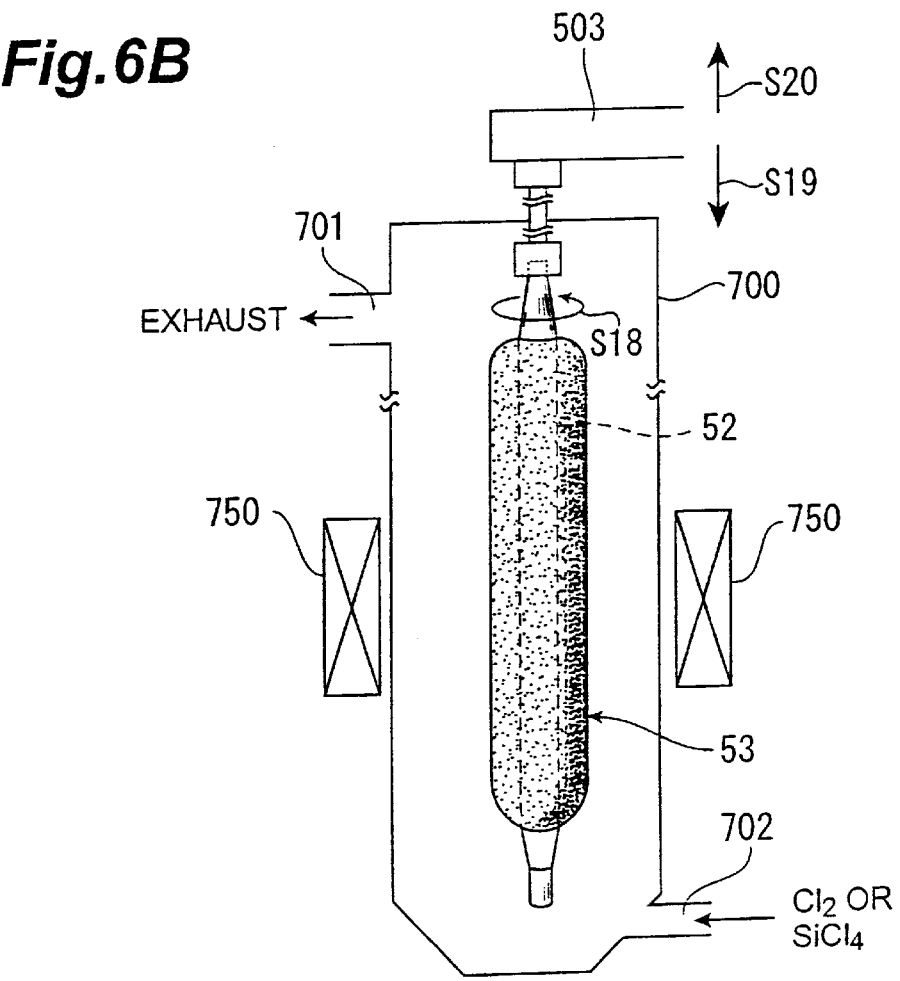

The porous intermediate product 53 obtained through the above second deposition step is heated temporarily in an atmosphere containing a halogen gas for the purpose of dehydration to be performed before the second sintering step (see FIG. 6B). Meanwhile, the support mechanism 503 operates to move the porous intermediate product 53 along the direction indicated by an arrow S20 while rotating it in the direction indicated by an arrow S19. With this operation, the entire porous intermediate product 53 is heated. Note that $Cl_2$ or $SiCl_4$ maybe used as this dehydration gas.

Figure 7A:
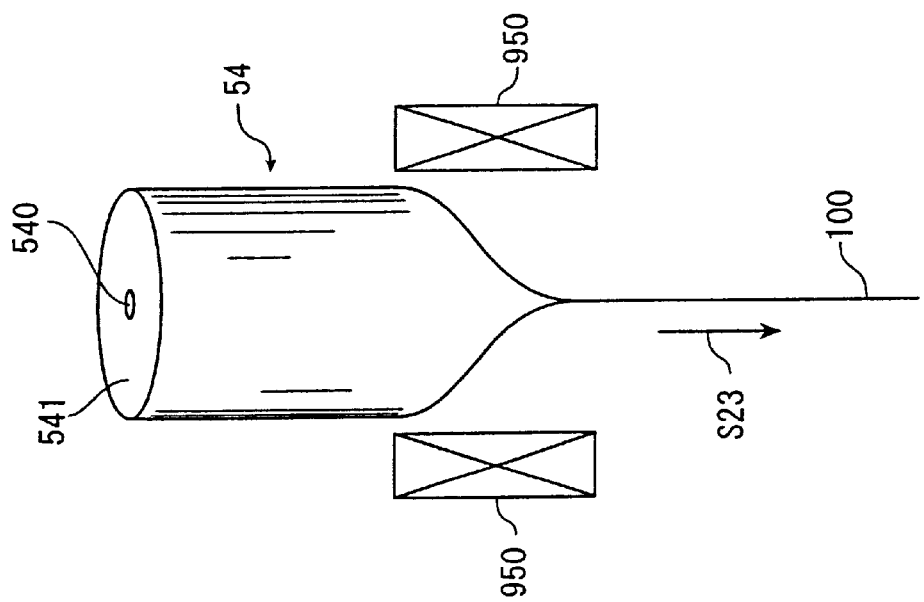
FIGS. 7A and 7B are views for respectively explaining the second sintering step (FIG. 7A) and the drawing step (FIG. 7B) in the process of manufacturing the optical fiber according to the present invention.
Figure 7B:
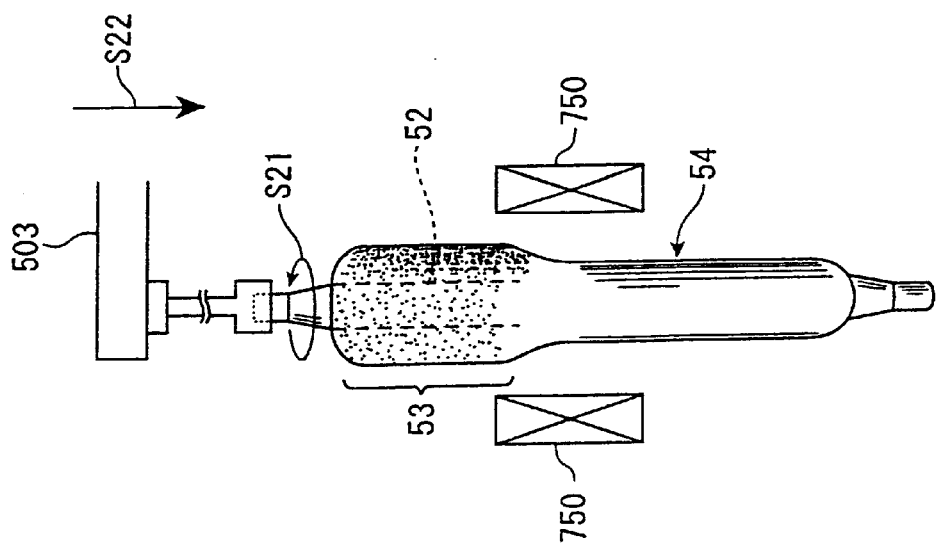

In the second sintering step, in order to obtain a transparent optical fiber preform 54, the dehydrated porous intermediate product 53 is sintered, as shown in FIG. 7A. In this sintering step, chlorine in the drawn core glass preform 52 diffuses into a peripheral glass body. As a consequence, chlorine is contained in part of the cladding region of the obtained optical fiber, and the concentration of chlorine of the core region increases from a peripheral portion of the core region to its center.

This sintering process is continuously performed in the heating vessel 700. The support mechanism 503 operates to move the porous intermediate product 53 along the direction indicated by an arrow S22 while rotating it in the direction indicated by an arrow S21. With this operation, the porous intermediate product 53 is transferred into the heater 750. As a fluorine-based gas to be supplied into the heating vessel 700, $SF_6$, $SiF_4$, or the like can be used. When the porous intermediate product 53 is heated in a fluorine-based gas atmosphere in this manner, a porous glass layer serving as the cladding region 120 (320) is impregnated with fluorine. The optical fiber preform 54 can be obtained by sintering the porous intermediate product 53 upon raising the temperature in the vessel. Note that the contents of fluorine is adjusted by adjusting the concentration of a fluorine-based gas supplied. In addition, the concentration of fluorine added can be adjusted to a desired concentration by properly adjusting the concentration of a fluorine-based gas in the process of impregnating the porous intermediate product 53 with fluorine and the sintering process. To set the diameter ratio between the core region and the cladding region to a desired value (to form a jacket layer that makes no contribution to the propagation of light), the deposition and sintering steps shown in FIGS. 6A and 7A may be further performed. In this case, dehydration may be omitted.

The optical fiber preform 54 obtained through the plurality of steps described above comprises a region 540 serving as a core and a region 541 serving as a cladding region after drawing. An end of the optical fiber preform 54 is introduced into a heater 950 and taken up while being stretched in the direction indicated by an arrow S23 in FIG. 7B, thus obtaining the optical fiber 10 (300) according to the present invention.

As has been described above, according to the present invention, since the Rayleigh scattering coefficient caused by chlorine added in the core region is small, the transmission loss due to Rayleigh scattering is small. In addition, the differences in physical property value between the core region and the cladding region decrease as the core region is doped with chlorine, and hence the transmission loss due to structural mismatching or the like at the interface between the core region and the cladding region is small. Furthermore, since the peak value of the relative refractive index difference of the core region with respect to the refractive index of pure silica is 0.05% or more, the bending loss is greatly reduced. When the concentration of chlorine added in the core region increases from a peripheral portion of the core region to its center, the differences in physical property value between the core region and the cladding region can be further reduced. This further reduce the transmission loss due to structure mismatching or the like at the interface between the core region and the cladding region.

As described above, the above optical fiber is suited for a cable and can be suitably used as an optical transmission line in a long-haul optical communication system.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

The basic Japanese Applications No. 7-072372 filed on Mar. 6, 1995, No.7-168298 filed on Jun.9, 1995, No.8-075343 filed on Mar. 5, 1996, No. 8-3129878 filed on Nov. 9, 1996 are hereby incorporated by reference.

What is claimed is:

1. An optical fiber comprising a core whose part is doped with at least chlorine, said optical fiber having:
    a transmission loss of 0.175 dB/km or less at a wavelength of 1.55 $\mu$m; and
    an increase in transmission loss due to an OH-radical of 0.5 dB/km or less at a wavelength of 1.38 $\mu$m.

2. An optical fiber according to claim 1, further having a zero-dispersion wavelength of 1.34 $\mu$m or longer.

3. An optical fiber according to claim 1, further having an effective area of 100 $\mu m^2$ or more at the wavelength of 1.55 $\mu$m.

4. An optical fiber according to claim 1, further having a bending loss of 0.5 dB/m or less at the wavelength of 1.55 $\mu$m when said optical fiber is bent with a diameter of 20 mm.

* * * * *